United States Patent
Shin et al.

(10) Patent No.: US 10,910,960 B2
(45) Date of Patent: Feb. 2, 2021

(54) ENERGY HARVESTING SYSTEM BASED ON REVERSE ELECTRO WETTING ON DIELECTRIC

(71) Applicants: HYUNDAI MOTOR COMPANY, Seoul (KR); KIA MOTORS CORPORATION, Seoul (KR); Inha University Research and Business Foundation, Incheon (KR)

(72) Inventors: Gee Young Shin, Suwon-si (KR); Hyun Il Ryu, Suwon-si (KR); Fuwad Ahmed, Incheon (KR); Tae Joon Jeon, Suwon-si (KR); Sun Min Kim, Seoul (KR)

(73) Assignees: HYUNDAI MOTOR COMPANY, Seoul (KR); KIA MOTORS CORPORATION, Seoul (KR); INHA UNIVERSITY RESEARCH AND BUSINESS FOUNDATION, Incheon (KR)

( * ) Notice: Subject to any disclaimer, the term of this patent is extended or adjusted under 35 U.S.C. 154(b) by 37 days.

(21) Appl. No.: 16/359,127

(22) Filed: Mar. 20, 2019

(65) Prior Publication Data
US 2020/0153363 A1    May 14, 2020

(30) Foreign Application Priority Data
Nov. 12, 2018    (KR) .................. 10-2018-0138414

(51) Int. Cl.
*H02K 1/08*    (2006.01)
*H02N 1/08*    (2006.01)

(52) U.S. Cl.
CPC .................................. *H02N 1/08* (2013.01)

(58) Field of Classification Search
CPC ....................................................... H02K 1/08
(Continued)

(56) References Cited

U.S. PATENT DOCUMENTS 8,907,504 B2 * 12/2014 Vallarino ............... H02N 3/00
290/1 R
10,050,567 B2 * 8/2018 Kwon ................ H02N 11/002
(Continued)

OTHER PUBLICATIONS

"Equations for a falling body" at https://en.wikipedia.org/wiki/Equations_for_a_falling_body, printed on Jun. 2020.*
(Continued)

*Primary Examiner* — John K Kim
(74) *Attorney, Agent, or Firm* — Brinks Gilson & Lione

(57) ABSTRACT

An energy harvesting system based on reverse electro wetting on a dielectric includes: a dielectric material layer molded with a dielectric material in a panel shape and including an upper end and a lower end; and an electrode layer including a plurality of electrodes coupled to a lower surface of the dielectric material layer. In particular, the upper end of the dielectric material layer is located higher than the lower end and allows a liquid drop to flow from the upper end to the lower end, and the dielectric material layer generates dielectric polarization in the dielectric material layer and continuously varies a flow rate of the liquid drop between the upper end and the lower end of the dielectric material layer. The plurality of electrodes are disposed to be spaced apart from one another in a direction from the upper end to the lower end.

12 Claims, 7 Drawing Sheets

(58) Field of Classification Search
USPC .................................................. 310/308, 309
See application file for complete search history.

(56) References Cited

U.S. PATENT DOCUMENTS

| | | | | |
|---|---|---|---|---|
| 2010/0295415 A1* | 11/2010 | Despesse | ................. | H02N 1/08 310/300 |
| 2012/0146456 A1* | 6/2012 | Vallarino | ................. | H02N 3/00 310/309 |
| 2020/0153363 A1* | 5/2020 | Shin | ........................ | H02N 1/08 |

OTHER PUBLICATIONS

Cho et al., "Micro Energy Harvesting System Based on Reverse Electro Wetting on Dielectric (REWOD)", The KSFM Journal of Fluid Machinery, vol. 18, No. 6, Dec. 2015, pp. 27-30.

* cited by examiner

FIG. 1 ("PRIOR ART")

ENERGY HARVESTING SYSTEM BASED ON REVERSE ELECTRO WETTING ON DIELECTRIC

CROSS REFERENCE TO RELATED APPLICATION

This application claims priority to and the benefit of Korean Patent Application No. 10-2018-0138414, filed on Nov. 12, 2018, the entire contents of which are incorporated herein by reference.

FIELD

The present disclosure relates to an energy harvesting system based on reverse electro wetting on a dielectric, which converts mechanical energy into electric energy using a movement of a liquid drop.

BACKGROUND

The statements in this section merely provide background information related to the present disclosure and may not constitute prior art.

Energy harvesting technology refers to collect and reuse light energy, thermal energy, kinetic energy, and the like which are not used and discarded in daily life. Utilization is too cumbersome as well as output power is low so that the practical use has not been actively carried out. However, owing to the recent developments in the Internet of Things (IoT) and ubiquitous technologies, there is a demand for energy harvesting technology capable of continuously supplying power in spite of low output power.

Meanwhile, when a liquid drop such as water which is a polarity material comes into contact with a dielectric material such as a polymer or the like, the water has positive charges at an interface between the water and the dielectric material, and the dielectric material forms an electric double layer having negative charges. A surface of the dielectric material is charged with negative charges and, at the same time, dielectric polarization occurs inside the dielectric material and thus a surface of the dielectric material in contact with an electrode has positive charges. Consequently, electrons move through the electrode below the dielectric material such that a current flows. This is called a reverse electro wetting phenomenon (see the document: "Micro Energy Harvesting System Based On Reverse Electro Wetting On Dielectric (REWOD)," collected papers of Korean Society for Fluid machinery, Vol. 18, No. 6, pp. 27~30, 2015).

However, as shown in FIG. 1, in a conventional energy harvesting system based on reverse electro wetting on a dielectric has a constant inclination such that a situation in which a liquid drop W approaches to an electrode 200 and a situation in which the liquid drop W departs from the electrode 200 may occur simultaneously. We have discovered that there is a problem in that a plurality of electrodes have negative charges and thus there is no potential difference between the plurality of electrodes such that a current 10 is not generated.

Therefore, even in the energy harvesting system based on reverse electro wetting on a dielectric, it is desired for a new structure in which a net current is generated by varying a flow rate of a liquid drop.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to propose an energy harvesting system based on reverse electro wetting on a dielectric, which converts mechanical energy into electric energy using a movement of a liquid drop, which is easily seen from the surroundings, without a separate power supply.

According to one aspect, the present disclosure provides an energy harvesting system based on reverse electro wetting on a dielectric, and the energy harvesting system includes: a dielectric material layer molded with a dielectric material in a panel shape and having an upper end and a lower end; and an electrode layer including a plurality of electrodes coupled to a lower surface of the dielectric material layer. In particular, the upper end is located higher than the lower end in the gravity direction and configured to allow a liquid drop to flow from the upper end to the lower end along an upper surface of the dielectric material layer, and the upper surface of the dielectric material layer is configured to generate dielectric polarization in the dielectric material layer by a flow of the liquid drop, and configured to continuously vary a flow rate of the liquid drop between the upper end and the lower end of the dielectric material layer. Electrodes of the plurality of electrodes may be disposed to be spaced apart from one another in a direction from the upper end of the dielectric material layer to the lower end thereof and may be polarized by the dielectric polarization of the dielectric material layer.

In one form, the dielectric material layer includes bent portions disposed between the upper end and the lower end of the dielectric material layer so as to continuously vary the flow rate of the liquid drop.

The energy harvesting system may further include a cover layer formed of a hydrophobic substance in a panel shape and coupled to the upper surface of the dielectric material layer.

The liquid drop may flow along an upper surface of the cover layer.

The energy harvesting system may further include a base substrate coupled to the lower surface and the electrode layer of the dielectric material layer.

The dielectric material layer may include a first portion inclined with a predetermined inclination angle and a second portion inclined with an inclination angle that is greater than the predetermined inclination angle of the first portion, and the first portion and the second portion may be alternately disposed such that the dielectric material layer may be continuously bent between the upper end and the lower end of the dielectric material layer.

In another form, electrodes of the plurality of electrodes may be coupled to a lower surface of the first portion and a lower surface of the second portion of the dielectric material layer.

An upper end and a lower end of a first electrode of the plurality of electrodes which is coupled to the first portion may be disposed at positions aligned with an upper end and a lower end of the first portion, an upper end and a lower end of a second electrode of the plurality of electrodes which is coupled to the second portion may be disposed at positions aligned with an upper end and a lower end of the second portion, and the upper ends and the lower ends of the first and second electrodes coupled to the first portion and the second portion may be spaced apart from one another.

The plurality electrodes may be coupled to be across a lower surface of the first portion and a lower surface of the second portion at bent points of the first portion and the second portion.

The bent points of the first and second portions may be formed in a curved line shape.

The plurality of electrodes may be coupled to a lower surface of the first portion and a lower surface of the second portion of the dielectric material layer.

The plurality electrodes may be coupled to be across a lower surface of the first portion and a lower surface of the second portion at bent points of the first portion and the second portion.

Each of the plurality of electrodes may be configured with first electrodes and second electrodes, and the first electrodes and the second electrodes may be alternately disposed on the lower surface of the dielectric material layer.

The energy harvesting system may further include a pair of suppliers provided at both ends of the electrode layer to allow a current to flow, wherein the first electrodes may be connected to one supplier of the pair of suppliers provided at one side of the electrode layer, and the second electrodes may be connected to the other supplier of the pair of suppliers provided at the other side of the electrode layer.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
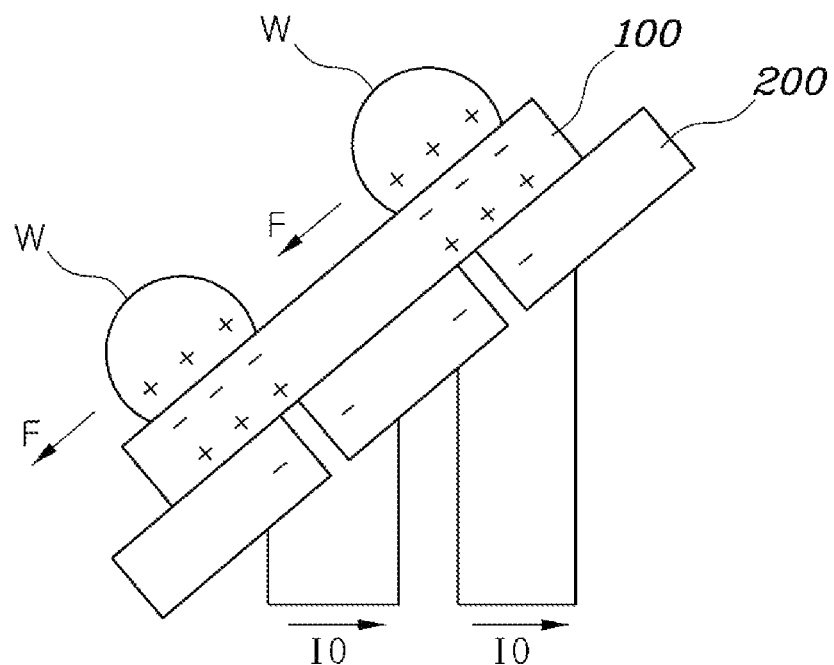
FIG. 1 is a diagram illustrating a concept of a conventional energy harvesting system based on reverse electro wetting on a dielectric.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
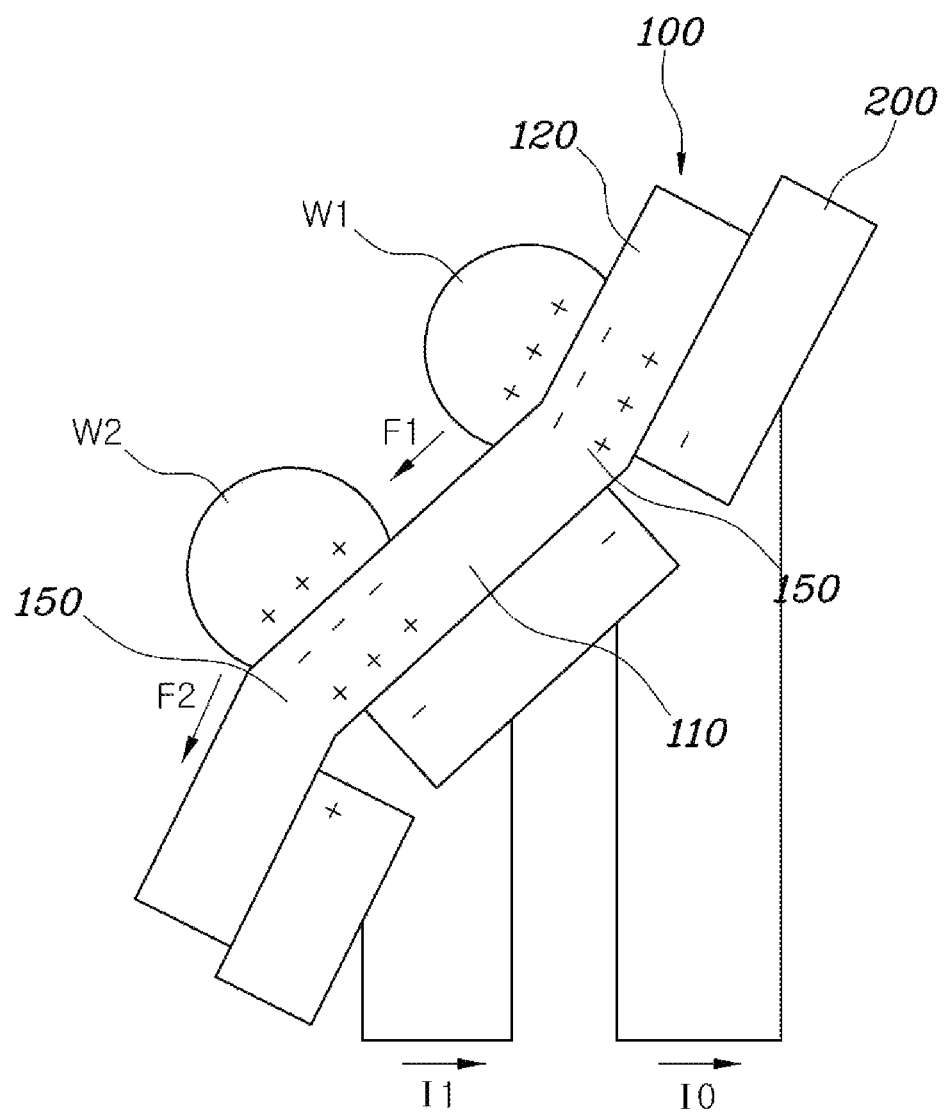
FIG. 2 is a diagram illustrating a concept of an energy harvesting system based on reverse electro wetting on a dielectric according to one form of the present disclosure.
Figure 3:
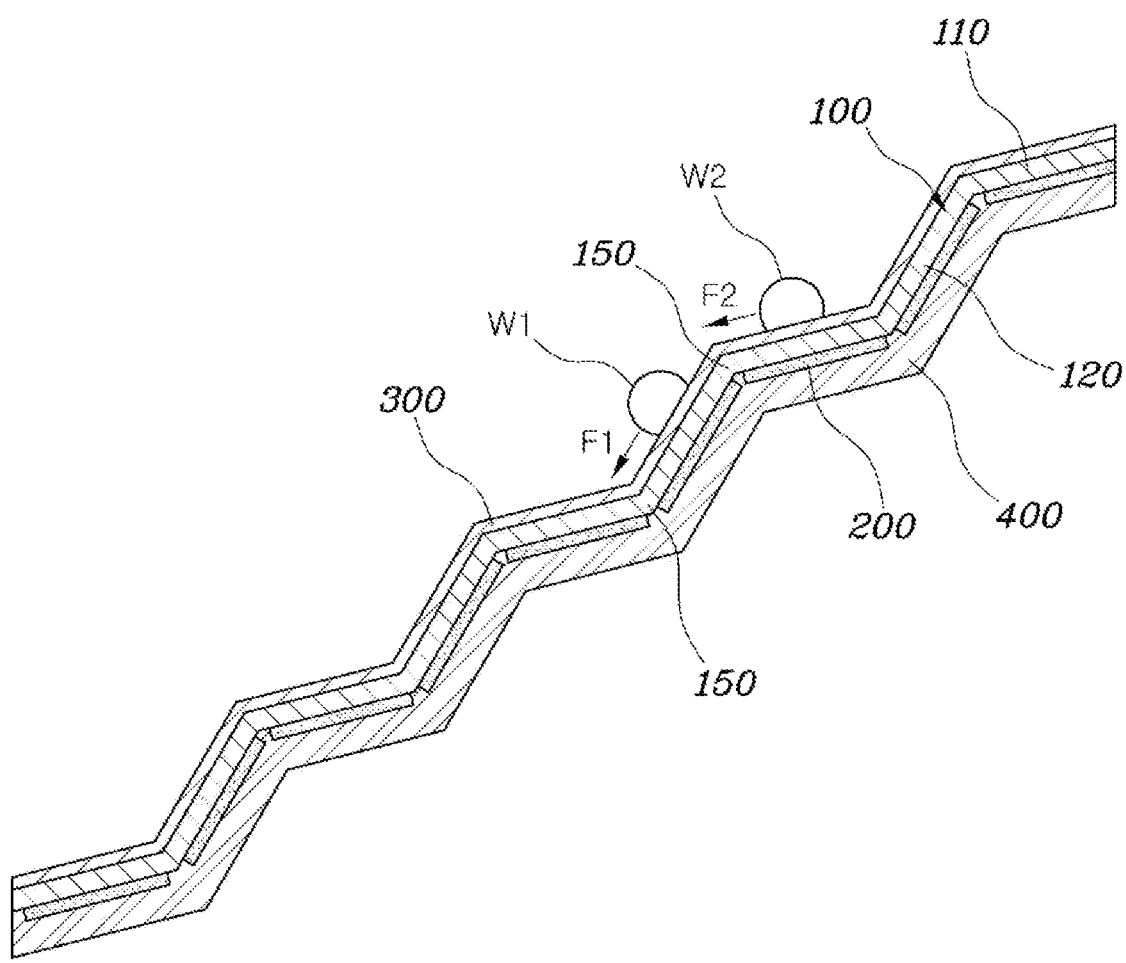
FIG. 3 is a diagram illustrating the energy harvesting system based on reverse electro wetting on a dielectric according to one form of the present disclosure.
Figure 4:
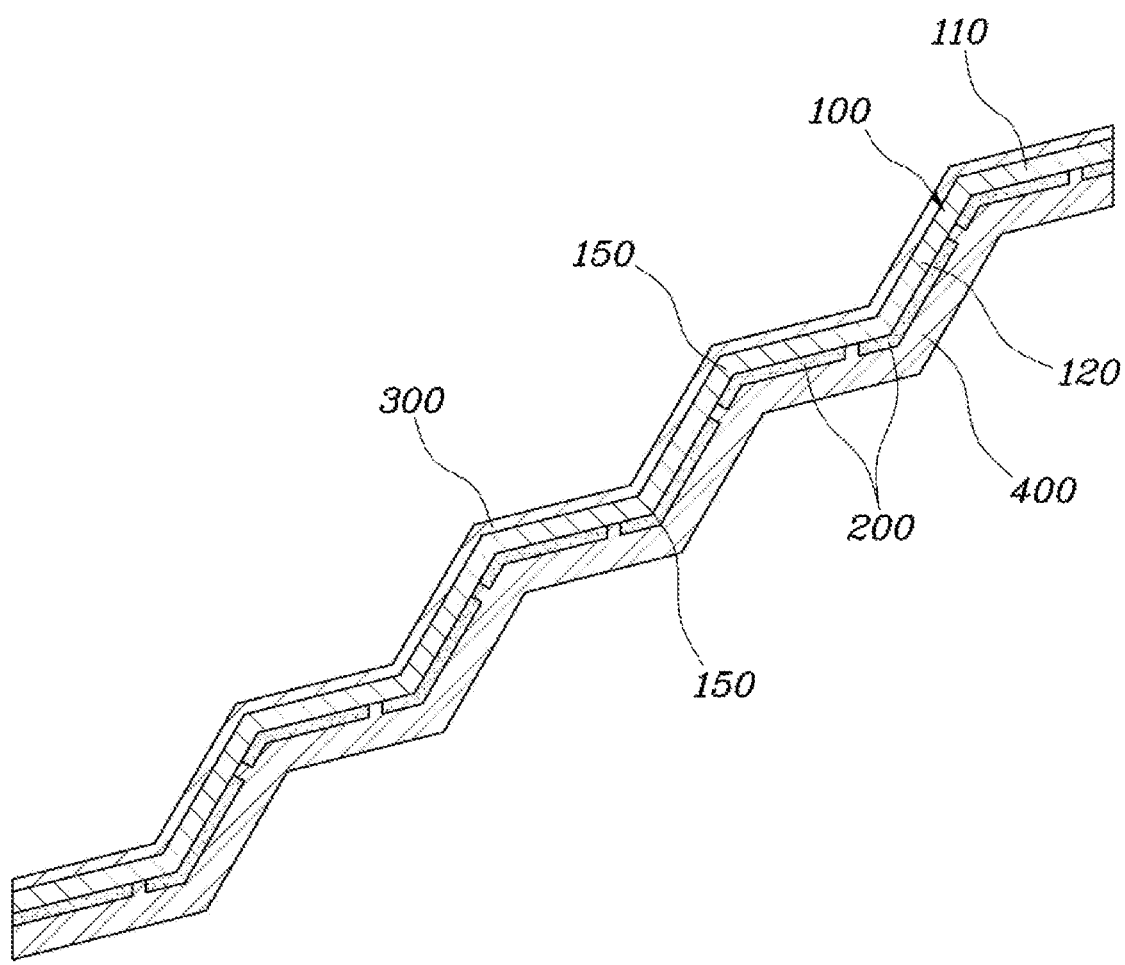
FIG. 4 is a diagram illustrating an energy harvesting system based on reverse electro wetting on a dielectric according to another form of the present disclosure.
Figure 5:
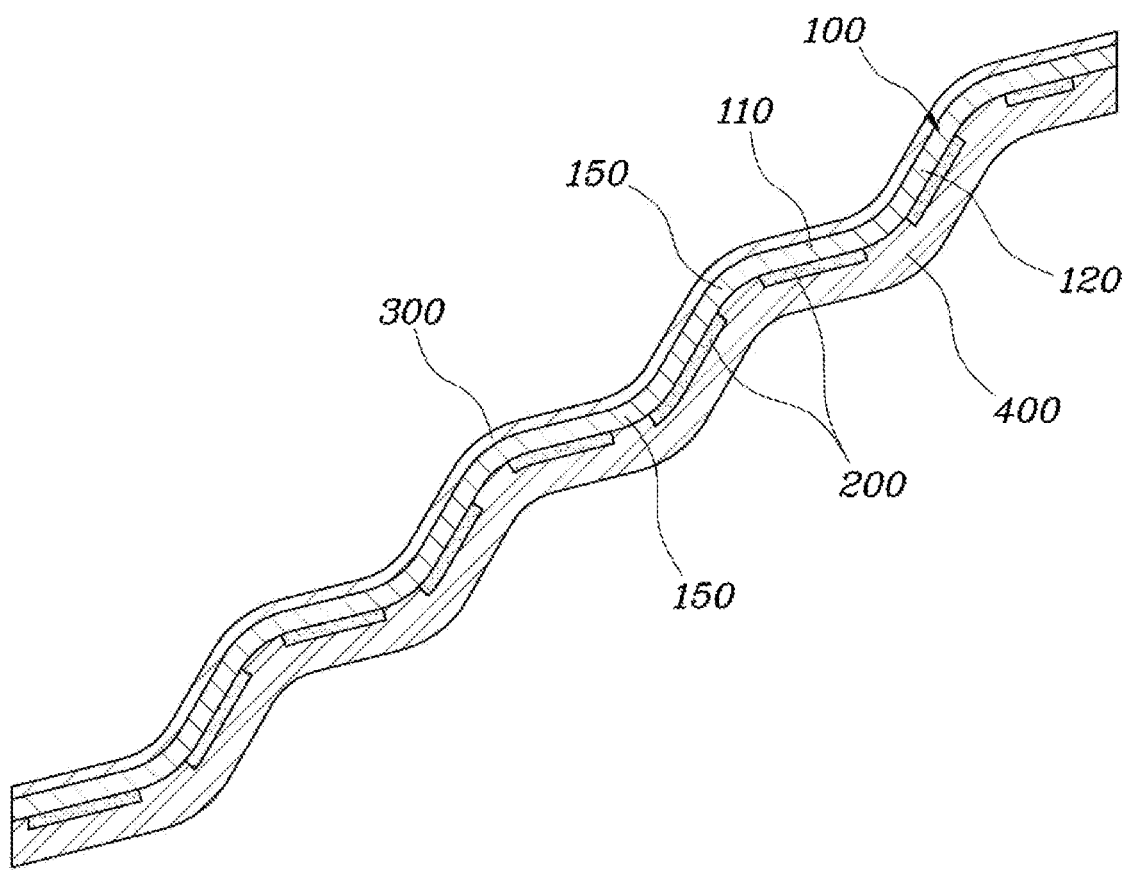
FIG. 5 is a diagram illustrating an energy harvesting system based on reverse electro wetting on a dielectric according to still another form of the present disclosure.
Figure 6:
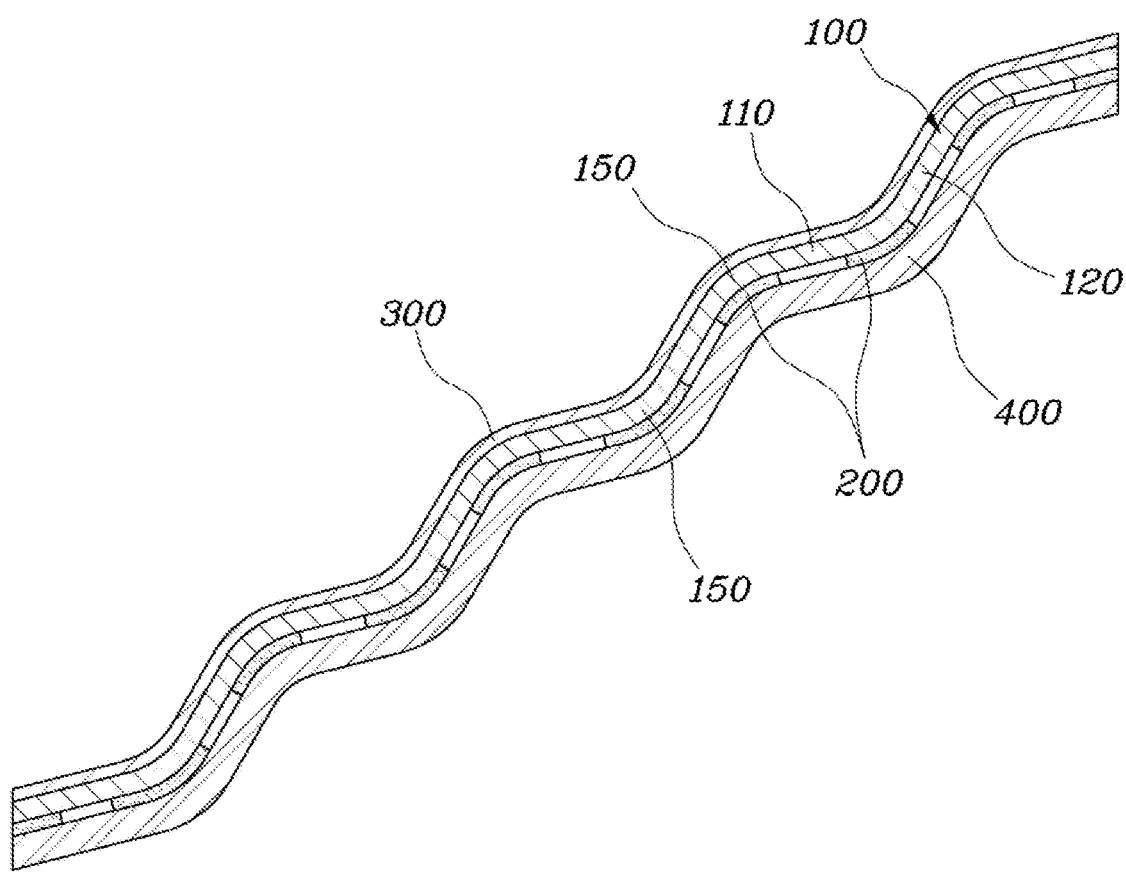
FIG. 6 is a diagram illustrating an energy harvesting system based on reverse electro wetting on a dielectric according to yet another form of the present disclosure.
Figure 7:
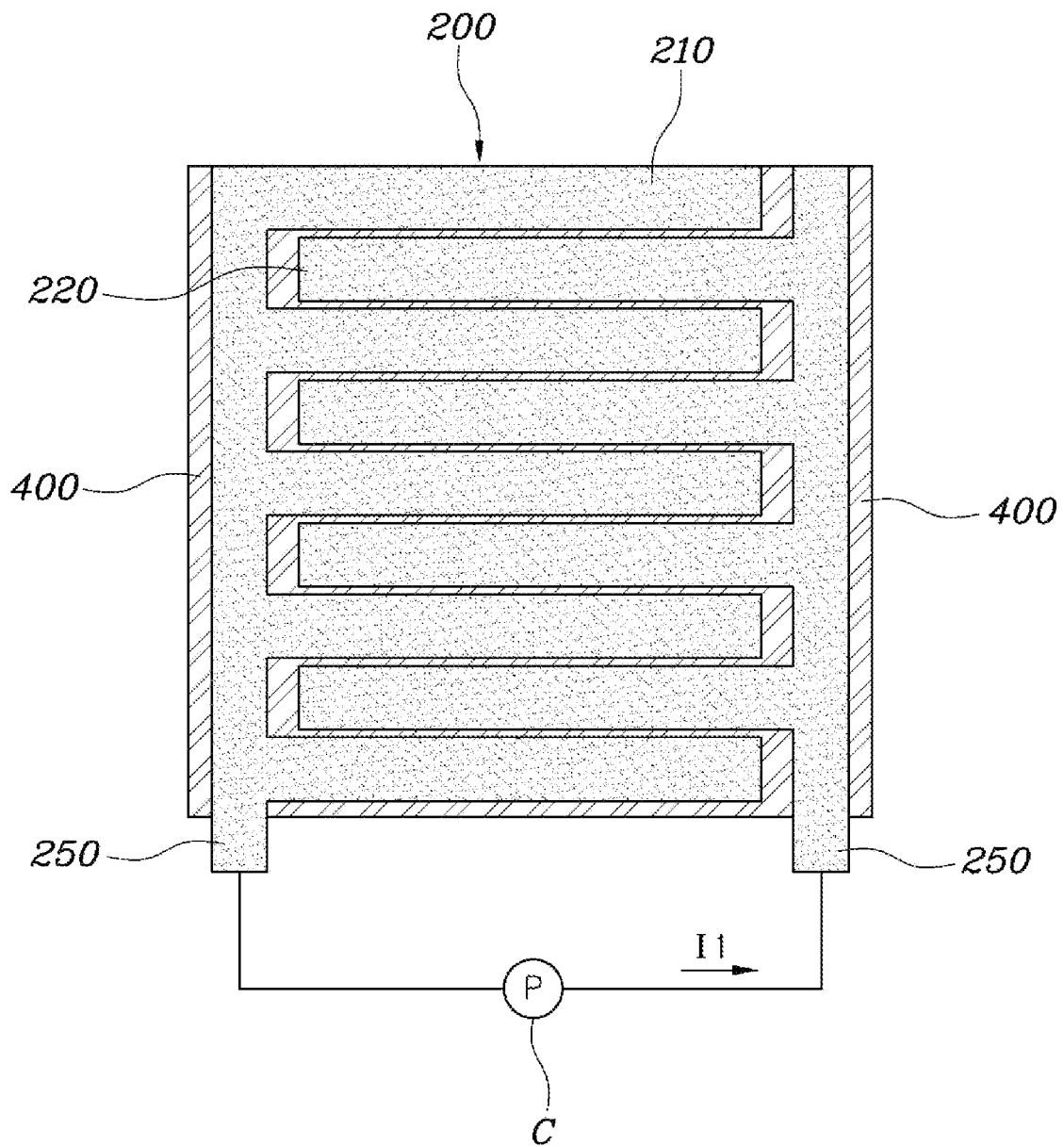
FIG. 7 is a diagram illustrating an electrode layer and a support of the energy harvesting system based on reverse electro wetting on a dielectric according to still yet another form of the present disclosure.

FIG. 1 is a diagram illustrating a concept of an energy harvesting system based on reverse electro wetting on a dielectric, FIG. 2 is a diagram illustrating a concept of an energy harvesting system based on reverse electro wetting on a dielectric according to one form of the present disclosure, FIG. 3 is a diagram illustrating the energy harvesting system based on reverse electro wetting on a dielectric according to one form of the present disclosure, FIG. 4 is a diagram illustrating an energy harvesting system based on reverse electro wetting on a dielectric according to another form of the present disclosure, FIG. 5 is a diagram illustrating an energy harvesting system based on reverse electro wetting on a dielectric according to still another form of the present disclosure, FIG. 6 is a diagram illustrating an energy harvesting system based on reverse electro wetting on a dielectric according to yet another form of the present disclosure, and FIG. 7 is a diagram illustrating an electrode layer and a support of an energy harvesting system based on reverse electro wetting on a dielectric according to still yet another form of the present disclosure.

As shown in FIGS. 2 to 6, the energy harvesting system based on reverse electro wetting on dielectric includes: a dielectric material layer 100 molded with a dielectric material in a panel shape and including an upper end and a lower end; and an electrode layer including a plurality of electrodes 200. In particular, the upper end is located higher than the lower end such that a liquid drop W flows from the upper end to the lower end along an upper surface of the dielectric material layer 100, and thus the upper surface of the dielectric material layer generates dielectric polarization in the dielectric material layer by a flow F of the liquid drop W. In particular, the dielectric material layer has consecutive bent portions 150 extending from the upper end toward the lower end to continuously vary a flow rate of the liquid drop W. The plurality of electrodes 200 is coupled to a lower surface of the dielectric material layer 100, and electrodes of the plurality of electrodes 200 are disposed to be spaced apart from one another in a direction from the upper end of the dielectric material layer 100 to the lower end thereof and are polarized by the dielectric polarization of the dielectric material layer 100. As described above, the liquid drop W is allowed to flow on an upper surface of the energy harvesting system based on reverse electro wetting on a dielectric such that mechanical energy by gravity is converted into electric energy. In this case, a wire is connected between the spaced electrodes 200 to induce movements of electrons such that a current may be generated and utilized.

Even in the related art, an energy harvesting system based on reverse electro wetting on a dielectric converts mechanical energy into electric energy using liquid drop flow, but as shown in FIG. 1, the conventional energy harvesting system based on reverse electro wetting on a dielectric has a constant inclination such that a situation in which the liquid drop W approaches to the electrode 200 and a situation in which the liquid drop W departs from the electrode 200 may occur simultaneously. Consequently, there is a problem in that a plurality of electrodes 200 have negative charges and thus there is no potential difference between the plurality of electrodes 200 such that the current 10 is not generated. In order to resolve such a problem, the dielectric material layer 100 of the present disclosure has the consecutive bent portions 150 extending from the upper end to the lower end such that a flow rate of the liquid drop W is continuously varied. In particular, as shown in FIG. 2, a rate F1 with which the liquid drop W approaches to each of the plurality of electrodes 200 becomes different from a rate F2 with which the liquid drop W departs from each of the plurality of electrodes 200 on the upper surface of the dielectric material layer 100 and thus the liquid drop W remains longer at a position on the dielectric material layer 100, which has a low inclination angle, such that a probability of a potential difference between the plurality of electrodes 200 increases and, consequently, a current I1 is generated.

That is, as shown in FIG. 2, there is no potential difference between the electrodes 200 having negative charges and thus the current I0 does not flow. However, a potential difference is present between the electrodes 200 having positive and negative charges and thus the current I1 flows such that a current may be supplied without a separate power supply.

The dielectric material layer 100 may be formed of at least one material among polymethyl methacrylate (PMMA), polyethylene (PE), polystyrene (PS), polyvinylpyrrolidone (PVP), poly(4-vinylpenol, PVP) or polyethersulfone (PES), poly (4-methoxyphenylacrylate) (PMPA), poly(phenylacrylate) (PPA), poly(2,2,2-triluoroethyl methacrylate) (PTFMA), cyanoethylpullulan (CYEPL), polyvinyl chloride (PVC), poly(parabanic acid) resin (PPA), poly(t-butylstyrene) (PTBS), polythienylenevinylene (PTV), polyvinylacetate (PVA), poly(vinyl alcohol) (PVA), poly(rmethylstyrene) (PAMS), poly(vinyl alcohol)-co-poly(vinyl acetate)-co-poly(itaconic acid) (PVAIA), polyolefin, polyacrylate, parylene-C, polyimide, octadecyltrichlorosilane (OTS), poly(triarylamine) (PITA), poly-3-hexylthiophene (P3HT), cross-linked poly-4-vinylphenol or cross-linked PVP, poly(perfluoroalkenylvinyl ether), nylon-6, n-octadecylphosphonic acid (ODPA), polytetrafluoroethylene (PTFE), silicone, polyurethane, latex, cellulose acetate, poly(hydroxy ethyl methacrylate) (PHEMA), polylactide (PLA), polyglycolide (PGA), and polyglycolide-co-lactide (PGLA).

Further, the electrode 200 may be made of an inorganic electrode containing at least one among indium tin oxide (ITO), indium gallium oxide (IGO), chromium, aluminum, indium zinc oxide (IZO), indium gallium zinc oxide (IGZO), ZnO, $ZnO_2$, and $TiO_2$, or a metal electrode containing at least one among platinum, gold, silver, aluminum, iron, and copper, or an organic electrode containing at least one among polyethylenedioxythiophene (PEDOT), a carbon nanotube (CNT), graphene, polyacetylene, polythiophene (PT), Polypyrrole, polyparaphenylene (PPV), polyaniline, poly sulfur nitride, a stainless steel, an iron alloy containing chromium of 10% or more, a steel use stainless (SUS) 304, a SUS 316, a SUS 316L, a Co—Cr alloy, a Ti alloy, Ni—Ti, and polyparaphenylenevinylene.

Meanwhile, as shown in FIGS. 3 to 6, the energy harvesting system based on reverse electro wetting on dielectric further includes a cover layer 300 formed of a hydrophobic substance in a panel shape, coupled to the upper surface of the dielectric material layer 100, and configured to allow the liquid drop W to flow along an upper surface of the cover layer 300.

Thus, the cover layer 300 inhibits or prevents wetting of the energy harvesting system based on reverse electro wetting on a dielectric by the liquid drop W and allows the liquid drop W to pass smoothly along the upper surface of the energy harvesting system based on reverse electro wetting on a dielectric.

In addition, the energy harvesting system based on reverse electro wetting on a dielectric further includes a base substrate 400 coupled to the lower surface of the dielectric material layer 100 and the plurality of electrodes 200. The dielectric material layer 100 and the plurality of electrodes 200 are supported by the base substrate 400, thereby becoming parts for securing stiffness of the energy harvesting system based on reverse electro wetting on a dielectric.

As shown in FIGS. 2 to 6, the dielectric material layer 100 includes a first portion 110 inclined with a predetermined inclination angle by the bent portion 150 and a second portion 120 inclined with an inclination angle that is greater than that of the first portion 110. The first portion 110 and the second portion 120 are alternately disposed such that the dielectric material layer 100 may extend by having the consecutive bent portions 150. The inclination angle of the first portion 110 becomes to be different from that of the second portion 120 such that a rate F1 of a liquid drop W1 approaching to the first portion 110 becomes faster than a rate F2 of a liquid drop W2 departing from the first portion 110. Thus, a polarity of the electrode 200 generated by the liquid drop W1 approaching to the first portion 110 has negative charges, and the liquid drop W2 departing from the first portion 110 remains relatively longer in the first portion 110 and thus the second portion 120 has positive charges relative to the first portion 110 such that a potential difference occurs between the first portion 110 and the second portion 120 to generate the current I1.

Meanwhile, as shown in FIGS. 2 to 3, the plurality of electrodes 200 may be coupled to lower surfaces of the first portion 110 and the second portion 120 of the dielectric material layer 100. In particular, upper and lower ends of the electrode 200 coupled to the first portion 110 are disposed at positions aligned with upper and lower ends of the first portion 110, upper and lower ends of the electrode 200 coupled to the second portion 120 are disposed at positions aligned with upper and lower ends of the second portion 120, and the upper and lower ends of the electrode 200 coupled to the first portion 110 are spaced apart from those of the electrode 200 coupled to the second portion 120.

According to another form, as shown in FIG. 4, the electrodes 200 may be coupled at the bent portions 150 of the first portion 110 and the second portion 120 across the lower surfaces thereof. Thus, the plurality of electrodes 200 are variously disposed such that it is possible to control a time for which the liquid drop W remains on the plurality of electrodes 200, thereby adjusting an amount of suppliable current.

Alternatively, as shown in FIGS. 5 to 6, the bent portions 150 of the first portion 110 and the second portion 120 may be formed in a curved line shape. In particular, the plurality of electrodes 200 may be coupled to the lower surfaces of the first portion 110 and the second portion 120 of the dielectric material layer 100, and, alternatively, the plurality of electrodes 200 may be coupled at the bent portions 150 of the first portion 110 and the second portion 120 across the lower surfaces thereof. Thus, the bent portion 150 is formed in a curved line shape such that a rate of the liquid drop W is linearly varied at the bent portion 150 and the supplied current is also linearly varied.

Meanwhile, as shown in FIG. 7, each of the plurality of electrodes 200 is configured with first electrodes 210 and second electrodes 220, and the first electrodes 210 and the second electrodes 220 are alternately disposed on the lower surface of the dielectric material layer 100. In particular, a pair of suppliers 250 are further included at both ends of each of the plurality of electrodes 200 to allow a current to flow. The first electrodes 210 may be connected to the supplier 250 provided at one side of each of the plurality of electrodes 200, and the second electrodes 220 may be connected to the supplier 250 provided at the other side of each thereof. As described above, the plurality of electrodes 200 are integrally connected through the pair of suppliers 250 such that there is an advantage of increasing or maximizing an amount of a suppliable current. Further, as shown in FIG. 7, the energy harvesting system based on reverse electro wetting on a dielectric may operate a device C and the like using the current generated by connecting a wire to the pair of suppliers 250 provided on both of the sides of each of the plurality of electrodes 200, or may be used as a battery by connecting an electric condenser C to the pair of suppliers 250.

According to the present disclosure, there is provided an energy harvesting system based on reverse electro wetting on a dielectric, which converts mechanical energy into electric energy using a movement of a liquid drop, which is easily seen from the surroundings, without a separate power supply.

In particular, there is an economic advantage in that energy can be supplied without extra cost by harvesting energy using a liquid drop, which can be easily seen from anywhere, such as a raindrop in contact with a building glass.

Although specific forms of the present disclosure has been described and illustrated, those skilled in the art will appreciate that various alternations and modifications are possible without departing from the technical spirit of the present disclosure.

What is claimed is:

1. An energy harvesting system based on reverse electro wetting on a dielectric, the energy harvesting system comprising:
    a dielectric material layer molded with a dielectric material in a panel shape and including an upper end and a lower end, wherein the upper end is located higher than the lower end in a gravity direction and configured to allow a liquid drop to flow from the upper end to the lower end along an upper surface of the dielectric material layer, and the upper surface of the dielectric material layer is configured to generate dielectric polarization in the dielectric material layer by a flow of the liquid drop, and configured to continuously vary a flow rate of the liquid drop between the upper end and the lower end of the dielectric material layer; and
    an electrode layer including a plurality of electrodes coupled to a lower surface of the dielectric material layer, wherein electrodes of the plurality of electrodes are disposed to be spaced apart from one another in a direction from the upper end of the dielectric material layer to the lower end thereof and are polarized by the dielectric polarization of the dielectric material layer,
    wherein:
    the dielectric material layer includes a first portion inclined with a predetermined inclination angle and a second portion inclined with an inclination angle that is greater than the predetermined inclination angle of the first portion; and
    the first portion and the second portion are alternately disposed such that the dielectric material layer is continuously bent between the upper end and the lower end of the dielectric material layer.

2. The energy harvesting system of claim 1, further comprising:
    a cover layer formed of a hydrophobic substance in a panel shape and coupled to the upper surface of the dielectric material layer,
    wherein the liquid drop flows along an upper surface of the cover layer.

3. The energy harvesting system of claim 1, further comprising:
    a base substrate coupled to the lower surface of the dielectric material layer and the plurality of electrodes coupled to the lower surface of the dielectric material layer.

4. The energy harvesting system of claim 1, wherein the dielectric material layer includes bent portions disposed between the upper end and the lower end of the dielectric material layer so as to continuously vary the flow rate of the liquid drop.

5. The energy harvesting system of claim 1, wherein electrodes of the plurality of electrodes are coupled to a lower surface of the first portion and a lower surface of the second portion of the dielectric material layer.

6. The energy harvesting system of claim 5, wherein:
    an upper end and a lower end of a first electrode of the plurality of electrodes which is coupled to the first portion are disposed at positions aligned with an upper end and a lower end of the first portion;
    an upper end and a lower end of a second electrode of the plurality of electrodes which is coupled to the second portion are disposed at positions aligned with an upper end and a lower end of the second portion; and
    the upper ends and the lower ends of the first and second electrodes coupled to the first portion and the second portion are spaced apart from one another.

7. The energy harvesting system of claim 1, wherein electrodes of the plurality electrodes are coupled to be across a lower surface of the first portion and a lower surface of the second portion at bent points of the first portion and the second portion.

8. The energy harvesting system of claim 1, wherein bent points of the first and second portions are formed in a curved line shape.

9. The energy harvesting system of claim 8, wherein electrodes of the plurality of electrodes are coupled to a lower surface of the first portion and a lower surface of the second portion of the dielectric material layer.

10. The energy harvesting system of claim 8, wherein electrodes of the plurality electrodes are coupled to be across a lower surface of the first portion and a lower surface of the second portion at bent points of the first portion and the second portion.

11. The energy harvesting system of claim 1, wherein:
    each of the plurality of electrodes is configured with first electrodes and second electrodes; and
    the first electrodes and the second electrodes are alternately disposed on the lower surface of the dielectric material layer.

12. The energy harvesting system of claim 11, further comprising:
    a pair of suppliers provided at both ends of the electrode layer to allow a current to flow,
    wherein the first electrodes are connected to one supplier of the pair of suppliers provided at one side of the electrode layer, and the second electrodes are connected to the other supplier of the pair of suppliers provided at other side of the electrode layer.

* * * * *